United States Patent Office 3,629,462
Patented Dec. 21, 1971

3,629,462
QUATERNARY AMMONIUM COMPOUNDS
Reginald L. Wakeman, Philadelphia, Pa., and Alfonso N. Petrocci, Glen Rock, and Kenneth W. Prodo, Westfield, N.J., assignors to Millmaster Onyx Corporation, New York, N.Y.
No Drawing. Filed Aug. 12, 1969, Ser. No. 849,506
Int. Cl. A61l 13/00
U.S. Cl. 424—329                    3 Claims

ABSTRACT OF THE DISCLOSURE

A synergistic mixture of higher alkyl dimethyl pseudocuminyl ammonium chlorides wherein the alkyl group contains from 12 to 14 carbon atoms, and wherein the microbiocidal effectiveness of the mixture in hard water is that of the compound in the mixture which has the greatest hard water tolerance.

---

This invention relates to mixtures of homologous compounds of high microbiocidal potency which surprisingly act synergistically to retain the high hard water tolerance of the superior homolog.

The compounds used in this invention are the higher alkyl dimethyl pseudocuminyl ammonium chlorides, wherein the alkyl contains from 12 to 14 carbon atoms, and wherein the compounds are crystalline and nondeliquescent but which are, nevertheless, highly soluble in water.

The present compounds are prepared by reacting the particular alkyl dimethyl amine with trimethyl benzyl chloride that has been obtained by the chloromethylation of pseudocumene 1,2,4-trimethyl benzene).

The following example is illustrative of the present invention, but is not intended to serve as a limitation thereof:

EXAMPLE 1

A round-bottom, three-necked flask, equipped with an agitator, reflux condenser and heater, was charged with 58 grams (0.255 mol) n-dodecyl dimethyl amine, 42.5 grams (0.25 mol) pseudocuminyl chloride and 250 grams acetone.

The pseudocuminyl chloride was derived from 1,2,4-trimethyl benzene by the well-known process of chloromethylation with formaldehyde and HCl, and was thereafter rectified.

The mixture was heated to the boiling point and then refluxed for a period of four hours, during which time it reacted to form the quaternary ammonium salt. On gradual cooling to 15° C., it crystallized and was filtered off to yield a yellowish crystalline mass. This mass was then further purified by two additional recrystallizations from acetone. The final yield was 68 grams (or 70% of the theoretical) of a n-dodecyl dimethyl pseudocuminyl chloride, in the form of sparkling white, free-flowing, non-hygroscopic crystals. This material was found to be readily and freely soluble in water to more than 50% by weight of the water.

The product produced in the above manner assayed 99.5% pure, containing 0.97% water, as determined by the Karl Fischer method, and melted 166°–168° C.

Instead of acetone, other non-aqueous solvents can be used, as for example, methyl, ethyl or isopropyl alcohol, propylene glycol, dioxane, dimethyl formamide, dimethyl sulfoxide, or any other feasible non-aqueous solvent.

In the same manner, the tetradecyl, hexadecyl and other quaternary salts of the family may be prepared in excellent yield and of high quality, as crystalline materials. Mixtures of amines may also be employed to yield a crystalline product on reaction with pseudocuminyl chloride, as will be shown hereinafter.

If desired, these compounds may also be prepared in aqueous solution by reacting the individual amines or their mixtures. For example, one mol of dodecyl dimethylamine may be reacted with 0.98 mol of pseudocuminyl chloride in water to the amount of about the combined weight of the reactant if a 50% active solution is desired. A small portion of the water may be substituted with an equal amount of an alcohol such as ethanol or isopropanol for the purpose of making the solution less viscous. Heating the mixed materials at about 80° C. for about one hour is required to bring the reaction to essential completion.

Whether they are prepared in crystalline form or in solution, these compounds retain their microbiocidal potency in the presence of hard water, and even in the presence of very hard water. As the following data shows, the degree of hardness tolerated declines markedly from that of the dodecyl compound as the chain length of the alkyl increases. This is not a remarkable phenomenon, since many properties of members of a homologous series are known to vary with molecular size. It is, however, remarkable that a mixture of a compound of high hard water tolerance with another of considerably lower tolerance, retains the high tolerance of the superior compound.

The term "hard water" is generally used to describe water having at least about 75 p.p.m. of calcium carbonates or equivalent salts. However, naturally occurring water may, and usually does, run up to several hundred p.p.m.

EXAMPLE 2

Crystalline alkyl dimethyl pseudocuminyl ammonium chlorides, as listed in Table 1 following, were prepared by reacting the corresponding alkyl dimethyl amines and pseudocuminyl chlorides in equimolar amounts in acetone, by heating the mixtures on a steam bath at 50–80° C. for about one hour, during which time the reactions proceeded essentially to completion. On cooling, the products separated out as white crystals, which were filtered and washed with a little acetone, and dried in a vacuum desiccator.

In this manner, the dodecyl, tetradecyl and hexadecyl homologs were prepared. Also prepared were mixtures of dodecyl and tetradecyl dimethylamines in the proportions of 90/10, 70/30, 55/45 and 10/90 parts by weight of the dodecyl relative to the tetradecyl compounds.

TABLE 1.—ALKYL DIMETHYL PSEUDOCUMINYL AMMONIUM CHLORIDES

| Alkyl | Yield, percent of theory | Activity, percent | Melting point, ° C. |
|---|---|---|---|
| $C_{12}$ | 92.5 | 96.8 | 167–168 |
| $C_{14}$ | 91.5 | 98 | 174–175 |
| $C_{16}$ | 87 | 99 | 173–176 |

EXAMPLE 3

The quaternaries obtained in the above manner were tested for hard water tolerance by the standard method as given in the A.O.A.C. "Germicidal and Detergent Sanitizers, Official and Final Action," procedure No. 5023 (Official Method of the Association of Official Agricultural Chemists, 10th Edition, 1965, page 87). The method determines the number of surviving organisms and is, therefore, a quite accurate test of microbiocidal activity.

The organism employed was *Escherichia coli* ATCC No. 11229. Replicate tests were carried out, requiring 99.999% kill in 30 seconds, at a quaternary concentration of 200 p.p.m. in the presence of synthethic hard water of increasing levels of hardness as p.p.m. $CaCO_3$.

TABLE 2

Alkyl dimethyl pseudocuminyl ammonium chlorides

| Alkyl: | Hard water tolerance (p.p.m.) |
|---|---|
| $C_{12}$ | 1200 |
| $C_{14}$ | 700 |
| $C_{16}$ | 500 |
| 90/10, $C_{12}/C_{14}$ (Calculated, HWT 1,150.) | 1200 |
| 70/30, $C_{12}/C_{14}$ (Calculated, HWT 1,050.) | 1200 |
| 55/45, $C_{12}/C_{14}$ (Calculated, HWT 975.) | 1100 |
| 10/90, $C_{12}/C_{14}$ (Calculated, HWT 750.) | 900 |

The foregoing Table 2 clearly demonstrates the unexpected fact that the compound ($C_{12}$) of high hard water tolerance retains much of its potency even when as much as 90% of it is replaced by a compound ($C_{14}$) of much lower hard water tolerance.

Although it has been found that this synergism is effective in any proportion ranging from 90/10 to 10/90 parts by weight, the most effective results are achieved in a proportion ranging from 90/10 to 55/45 parts by weight of the lower chain relative to the higher chain.

The invention claimed is:

1. A germicidal mixture of dodecyl dimethyl pseudocuminyl ammonium chloride and tetradecyl dimethyl pseudocuminyl ammonium chloride in a proportion of between 90/10 and 10/90 parts by weight relative to each other.

2. A method of biocidally treating aqueous systems which comprises applying a germicidally effective amount of the composition of claim 1 to the aqueous system.

3. A method of biocidally treating a surface with a hard water aqueous system which comprises applying to said surface a germicidally effective amount of an aqueous composition consisting essentially of the mixture of claim 1 in hard water.

References Cited

UNITED STATES PATENTS 3,479,406  11/1969  Wakeman  260—567.6

ALBERT T. MEYERS, Primary Examiner

F. E. WADDELL, Assistant Examiner